United States Patent
Henry et al.

(10) Patent No.: US 9,442,732 B2
(45) Date of Patent: Sep. 13, 2016

(54) RUNNING STATE POWER SAVING VIA REDUCED INSTRUCTIONS PER CLOCK OPERATION

(71) Applicant: VIA Technologies, Inc., New Taipei (TW)

(72) Inventors: G. Glenn Henry, Austin, TX (US); Terry Parks, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 710 days.

(21) Appl. No.: 13/777,104

(22) Filed: Feb. 26, 2013

(65) Prior Publication Data

US 2013/0311755 A1    Nov. 21, 2013

Related U.S. Application Data

(60) Provisional application No. 61/612,437, filed on Mar. 19, 2012, provisional application No. 61/755,697, filed on Jan. 23, 2013.

(51) Int. Cl.
  *G06F 9/30*  (2006.01)
  *G06F 1/32*  (2006.01)

(52) U.S. Cl.
  CPC .......... *G06F 9/30189* (2013.01); *G06F 1/324* (2013.01); *G06F 1/3206* (2013.01);
  (Continued)

(58) Field of Classification Search
  CPC ... G06F 1/324; G06F 1/3243; G06F 9/30189
  See application file for complete search history.

(56) References Cited

U.S. PATENT DOCUMENTS 5,671,442 A    9/1997  Feeney et al.
6,240,468 B1   5/2001  Capelli
(Continued)

FOREIGN PATENT DOCUMENTS

CN    1630845 A    6/2005
CN    101048722 A   1/2011
(Continued)

OTHER PUBLICATIONS

"Buffer Overflow" Wikipedia, the free encyclopedia. Downloaded on Sep. 5, 2013 from http://en.wikipedia.org/wiki/Buffer_overflow. pp. 1-12.

(Continued)

*Primary Examiner* — Benjamin Geib
(74) *Attorney, Agent, or Firm* — E. Alan Davis; James W. Huffman; Eric W. Cernyar (57) ABSTRACT

A microprocessor includes functional units and control registers writeable to cause the functional units to institute actions that reduce the instructions-per-clock rate of the microprocessor to reduce power consumption when the microprocessor is operating in its lowest performance running state. Examples of the actions include in-order vs. out-of-order execution, serial vs. parallel cache access and single vs. multiple instruction issue, retire, translation and/or formatting per clock cycle. The actions may be instituted only if additional conditions exist, such as residing in the lowest performance running state for a minimum time, not running in a higher performance state for more than a maximum time, a user did not disable the feature, the microprocessor supports multiple running states and the operating system supports multiple running states.

28 Claims, 3 Drawing Sheets

(52) U.S. Cl.
CPC ............ *G06F 1/329* (2013.01); *G06F 1/3275* (2013.01); *Y02B 60/1217* (2013.01); *Y02B 60/1225* (2013.01); *Y02B 60/1228* (2013.01); *Y02B 60/144* (2013.01)

(56) References Cited

U.S. PATENT DOCUMENTS

| | | |
|---|---|---|
| 6,275,948 B1 | 8/2001 | Bays et al. |
| 6,289,396 B1 | 9/2001 | Keller et al. |
| 6,438,557 B1 | 8/2002 | Dent |
| 6,732,263 B1 | 5/2004 | May et al. |
| 6,948,050 B1 | 9/2005 | Gove et al. |
| 6,957,437 B1 | 10/2005 | Bogia et al. |
| 7,366,891 B2 | 4/2008 | Khanna et al. |
| 7,418,582 B1 | 8/2008 | Iacobovici et al. |
| 7,478,388 B1 | 1/2009 | Chen et al. |
| 7,558,723 B2 | 7/2009 | Traut |
| 7,774,531 B1 | 8/2010 | Karlsson |
| 2003/0093686 A1 | 5/2003 | Barnes et al. |
| 2004/0177269 A1 | 9/2004 | Belnet et al. |
| 2004/0193929 A1* | 9/2004 | Kuranuki ............ G06F 1/206 713/322 |
| 2004/0236971 A1* | 11/2004 | Kopley ............ G06F 1/3203 713/300 |
| 2005/0138449 A1 | 6/2005 | Katoh et al. |
| 2005/0210454 A1 | 9/2005 | DeWitt, Jr. et al. |
| 2006/0168590 A1 | 7/2006 | Khanna et al. |
| 2006/0212609 A1 | 9/2006 | Zimmer et al. |
| 2007/0043531 A1 | 2/2007 | Kosche et al. |
| 2007/0226795 A1 | 9/2007 | Conti et al. |
| 2008/0104363 A1 | 5/2008 | Raj et al. |
| 2008/0162886 A1 | 7/2008 | Saha et al. |
| 2008/0163212 A1 | 7/2008 | Zimmer et al. |
| 2009/0164812 A1 | 6/2009 | Capps, Jr. et al. |
| 2010/0011198 A1* | 1/2010 | Hooker ............ G06F 1/3203 713/1 |
| 2010/0058086 A1* | 3/2010 | Lee ............ G06F 9/5027 713/322 |
| 2010/0077232 A1* | 3/2010 | Jahagirdar ............ G06F 1/3203 713/300 |
| 2010/0191993 A1 | 7/2010 | Chaudhry et al. |
| 2010/0319001 A1 | 12/2010 | Jones |
| 2011/0238920 A1 | 9/2011 | Hooker et al. |
| 2011/0314312 A1* | 12/2011 | Naffziger ............ G06F 1/3203 713/323 |
| 2012/0144217 A1* | 6/2012 | Sistla ............ G06F 1/3228 713/320 |
| 2012/0159204 A1* | 6/2012 | Tang ............ G06F 1/3203 713/310 |

FOREIGN PATENT DOCUMENTS

| | | |
|---|---|---|
| CN | 101652739 A | 10/2011 |
| TW | 201106262 | 2/2011 |
| TW | 201234271 | 8/2012 |
| WO | WO02073336 | 9/2002 |

OTHER PUBLICATIONS

Prabhu, Pratap et al. "Smashing the Stack with Hydra." Downloaded on Sep. 5, 2013 from http://www.cs.columbia.edu/~yingbo/publications/defcon09hydra.pdf. pp. 1-22.

Shmatikov, Vitaly. "Buffer Overflow and Other Memory Corruption Attacks." Downloaded on Sep. 17, 2013 from http://www.cs.utexas.edu/~shmat/courses/cs378/memattacks.pdf. pp. 1-85.

"NOP slide" Wikipedia, the free encyclopedia. Downloaded on Sep. 17, 2013 from http://en.wikipedia.org/wiki/NOP_sled. pp. 1-2.

CLET Team. "Polymorphic Shellcode Engine." PHRACK Magazine. Downloaded Sep. 16, 2013 from http://www.phrack.org/issues.html?issue=61&id=9. pp. 1-24.

Solar Eclipse. "Honeynet Project Scan of the Month for Apr. 2002." Scan 20 by Solar Eclipse. Downloaded Sep. 5, 2013 from http://web.archive.org/web/20110724121400/http://www.phreedom.org/solar/honeynet/scan20/scan20.html. pp. 1-4.

Reinman, Glenn et al. "Using a Serial Cache for Energy Efficient Instruction Fetching." May 10, 2004. Retrieved from the Internet: http://www.sciencedirect.com/science/article/pii/S138376210400030X. Retrieved on Jul. 10, 2014 pp. 1-21.

Tarjan, David et al. "Federation: Repurposing Scalar Cores for Out-of-Order Instruction Issue." Jun. 8, 2008. Retrieved from the Internet: http://www.cs.virginia.edu/~skadron/papers/federation_dac08.pdf. Retrieved on Jul. 9, 2014 pp. 1-4.

"System Software." Wikipedia. Mar. 10, 2012 Retrieved from the Internet: https://en.wikipedia.org/w/index.php?title=System_software&oldid=481220522. Retrieved on Nov. 18, 2015. pp. 1-2.

"What is Microcode?" Definition from WhatIs.com. Apr. 1, 2005. Retrieved from the Internet: http://what.is.techtarget.com/definition/microcode. Retrieved on Nov. 18, 2015. pp. 1-8.

\* cited by examiner

FIG. 3

RUNNING STATE POWER SAVING VIA REDUCED INSTRUCTIONS PER CLOCK OPERATION

CROSS REFERENCE TO RELATED APPLICATION(S)

This application claims priority based on the following U.S. Provisional Applications, each of which is hereby incorporated by reference in its entirety:

| Serial No. | Filing Date | Title |
| --- | --- | --- |
| 61/612,437 | Mar. 19, 2012 | RUNNING STATE POWER SAVING VIA REDUCED INSTRUCTIONS PER CLOCK OPERATION |
| 61/755,697 | Jan. 23, 2013 | RUNNING STATE POWER SAVING VIA REDUCED INSTRUCTIONS PER CLOCK OPERATION |

BACKGROUND

The operating system may request a microprocessor to run at various performance levels (sometimes referred to as P-states). This is particularly useful in battery-operated devices in order to prolong battery life, although it may also be useful in desktop or server systems to reduce power consumption and its concomitant cost. For example, if the operating system detects that the workload is relatively low (e.g., the user is just watching a DVD which requires a relatively small fraction of the processing power of the microprocessor), the operating system may request the microprocessor to run in a performance-reduced state. Typically, the performance-reduced state includes the microprocessor operating at a reduced clock frequency (and typically a reduced operating voltage level). For example, if the operating system requests operation at the lowest performance running state, the microprocessor will reduce its operating frequency to the lowest ratio of the processor bus clock frequency at which the microprocessor is capable of operating (and request the power supply to reduce the operating voltage to the lowest level at which the microprocessor is capable of operating at the lowest clock ratio). For example, the microprocessor may include a phase-locked loop (PLL) that receives the bus clock signal and responsively generates the core clock signal as a ratio of the bus clock frequency, and the PLL has a finite number of ratios it can generate, and there is a lowest of these ratios.

Figure 1:
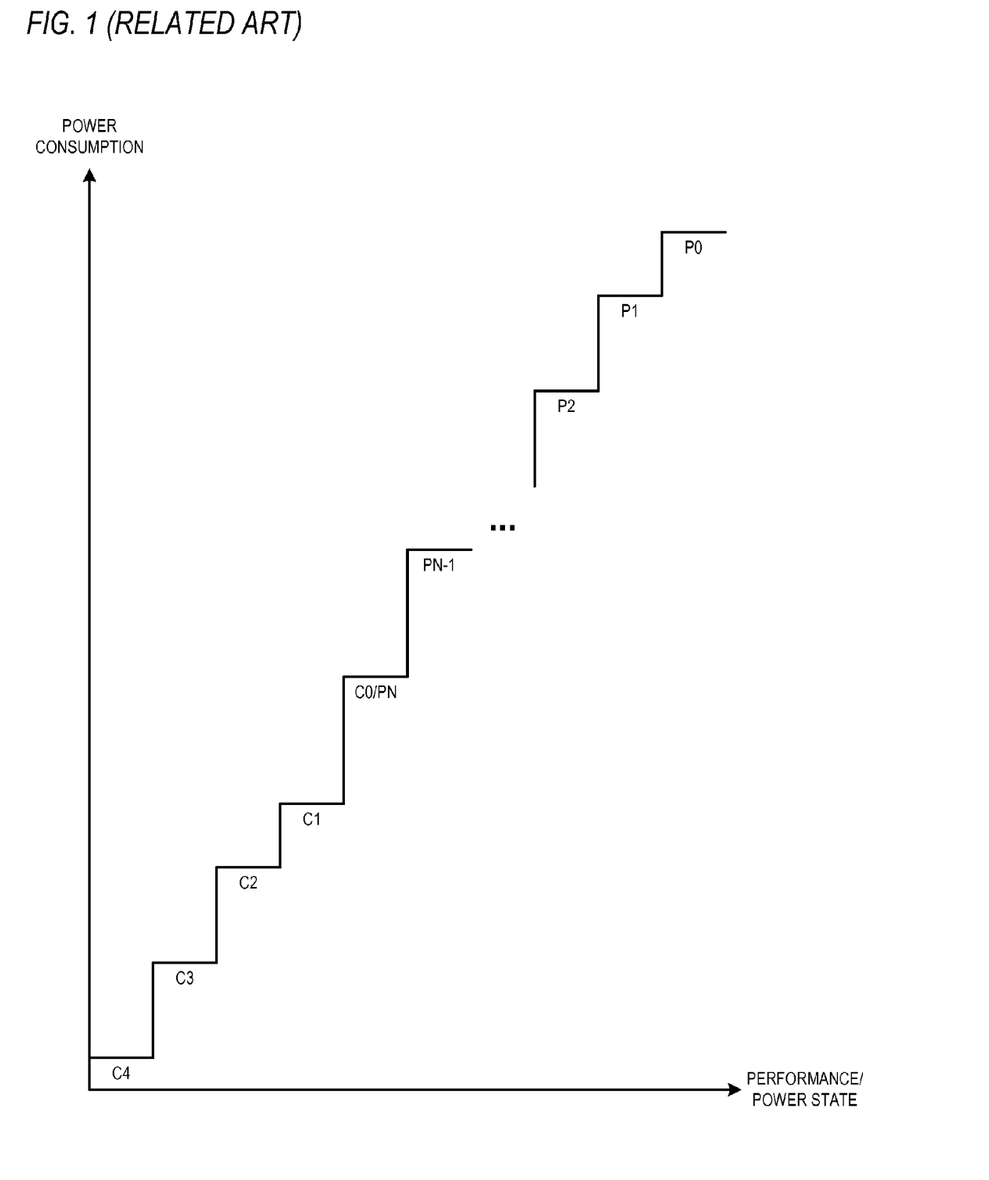
FIG. 1 is a graph of power consumption of a microprocessor as a function of performance states and power states.

However, even in the lowest performance running state, the workload imposed on the microprocessor by the software running on it (e.g., the operating system and application programs) may be very relatively small such that the microprocessor is idle a relatively large percentage of the time and therefore wasting power. For example, the software may be just looping waiting for user input (e.g., a mouse or keyboard click) with an occasional timer tick being serviced. Traditionally, in order to further reduce its power consumption from the lowest performance running state, the microprocessor must transition from a running state to a sleeping state, or power state (sometimes referred to as C-states), in which the microprocessor halts execution of instructions and may perform other power saving measures, such as disabling clock signals to portions of the microprocessor, or even removing power from portions of the microprocessor, such as cache memories. This is shown in FIG. 1, in which power consumption of the microprocessor is graphed as a function of the performance states and power states. However, the microprocessor cannot enter one of the sleeping states unless the operating system instructs it to do so. Therefore, what is needed is a way to reduce power consumption when the microprocessor is still in a running state but cannot lower its operating frequency any further.

BRIEF SUMMARY

In one aspect the present invention provides a microprocessor. The microprocessor includes functional units and control registers. The control registers are writeable to cause the functional units to institute one or more actions that reduce the instructions-per-clock rate of the microprocessor to reduce power consumption when the microprocessor is operating in its lowest performance running state. The lowest performance running state comprises a non-sleeping state in which the microprocessor runs at its lowest supported clock frequency.

In another aspect, the present invention provides a method for saving power consumption by a microprocessor. The method includes receiving a command to enter a lowest performance running state of the microprocessor, wherein the lowest performance running state comprises a non-sleeping state in which the microprocessor is running at its lowest supported clock frequency. The method also includes instituting one or more power saving actions that reduce the instructions-per-clock rate of the microprocessor, in response to the receiving the command to enter the lowest performance running state.

In yet another aspect, the present invention provides a computer program product encoded in at least one non-transitory computer usable medium for use with a computing device, the computer program product comprising computer usable program code embodied in said medium for specifying a microprocessor. The computer usable program code includes first program code for specifying functional units and second program code for specifying control registers. The control registers are writeable to cause the functional units to institute one or more actions that reduce the instructions-per-clock rate of the microprocessor to reduce power consumption when the microprocessor is operating in its lowest performance running state. The lowest performance running state comprises a non-sleeping state in which the microprocessor runs at its lowest supported clock frequency.

DETAILED DESCRIPTION OF THE EMBODIMENTS

In order to further reduce power consumption when the microprocessor is running at its lowest supported core clock frequency, embodiments are described herein in which the microprocessor selectively effectively reduces its instructions per clock (IPC) rate by one or more of various actions, such as, but not limited to, the following.

Figure 2:
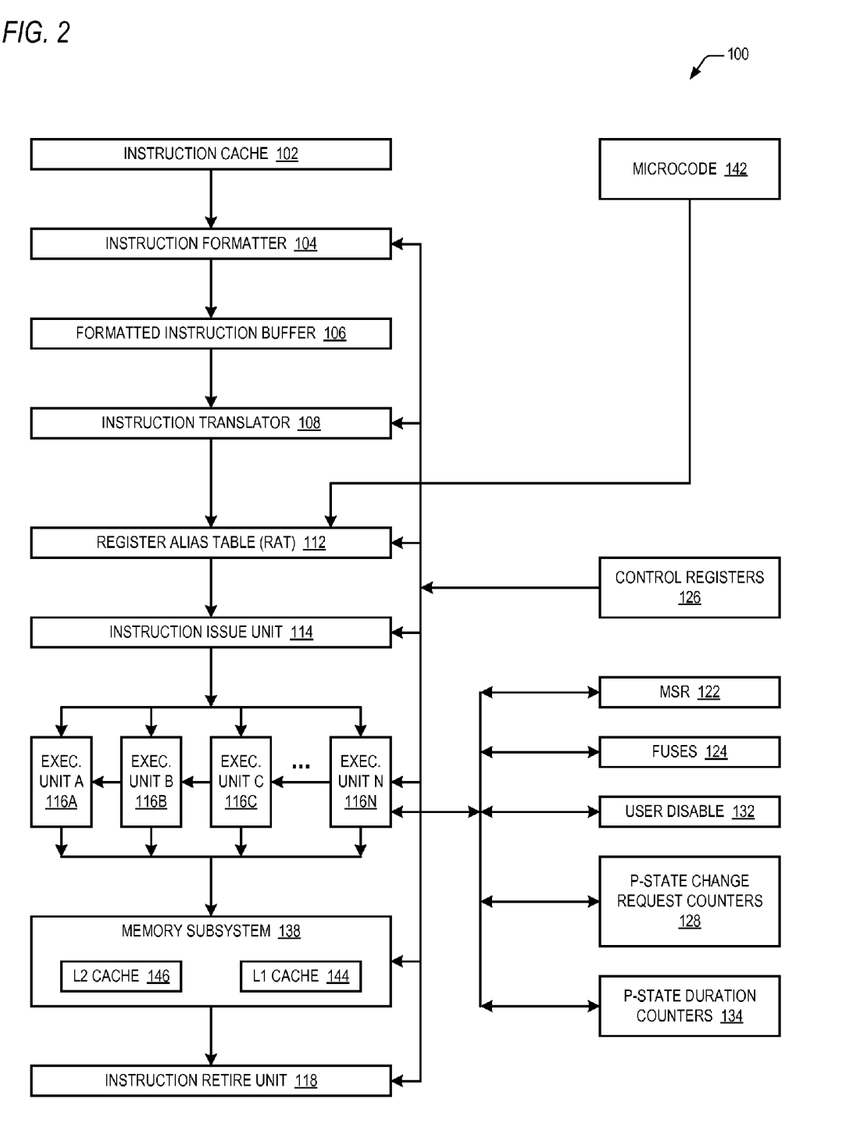
FIG. 2 is a block diagram of a microprocessor.

(1) forcing instructions to be executed in program order (in-order execution), even though the microprocessor normally executes instructions out-of-order. This will tend to reduce the number of speculatively executed instructions, which will tend to reduce the number of instructions that must later be canceled or replayed, which will tend to reduce the amount of power wasted on executing instructions that are subsequently canceled or replayed and therefore provide no benefit to accomplishing the task of the currently running program;

(2) forcing only one instruction to be issued per clock cycle (scalar issue), even though the microprocessor normally issues multiple (e.g., three) instructions per clock cycle (superscalar issue). This will tend to reduce the utilization of the execution units, which will tend to save power;

(3) formatting only a single instruction per clock cycle from the variable-length instruction stream fetched from the instruction cache, even though the microprocessor normally formats multiple (e.g., four) instructions per clock cycle. In a variable-length instruction set architecture, a stream of instruction bytes are fetched from the instruction cache and the stream must then be formatted into discrete instructions so that the individual instructions can be decoded (and potentially translated into simpler microinstructions) in order to be sent to the execution units for processing. That is, the microprocessor must determine the boundaries of the individual instructions within the stream of instruction bytes. Formatting a single instruction per clock cycle is much simpler than formatting three instructions per clock cycle, for example, and consequently requires less power. Furthermore, formatting a single instruction per clock cycle will tend to cause a dearth of instructions queued up for issue to the execution units, which will tend to reduce their utilization, which will tend to save power;

(4) accessing the various cache memories in the cache hierarchy (e.g., L1 and L2 caches) in a serial fashion, even though the microprocessor normally accesses the caches in parallel to improve performance. For example, to save power the L2 cache is accessed only if a miss occurs in the L1 cache; whereas, normally both caches are accessed in parallel in order to reduce data access latency in the event that the access misses is one cache but hits in another cache. This will tend to reduce the utilization of the caches, which will tend to save power;

(5) translating only a single macroinstruction (e.g., x86 instruction) per clock cycle, even though the instruction translator is capable of translating multiple macroinstructions per clock cycle. This also implies that instruction fusing, of which the instruction translator is capable, will be disabled. Translating a single macroinstruction per clock cycle will tend to cause a dearth of microinstructions queued up for issue to the execution units, which will tend to reduce their utilization, which will tend to save power;

(6) retiring only a single instruction per clock cycle, even though the instruction retire unit is capable of retiring multiple instructions per clock cycle. Retiring a single instruction per clock cycle will tend reduce the instruction per clock rate because stalls may be introduced into the microprocessor 100 pipeline if the instructions back up at the instruction retire unit, which will tend to save power.

Broadly speaking, the IPC-reduction power saving actions tend to either reduce power wastage by avoiding tasks that may turn out to be unnecessary but which are normally speculatively performed in order to speed up performance (e.g., in-order vs. out-of-order execution; serial vs. parallel cache access) or to spread out the execution of a given stream of instructions over a larger time frame (e.g., scalar vs. superscalar issue; single vs. multiple instruction format per clock). Again broadly speaking, it has been observed by the present inventors that spreading out the execution of a given stream of instructions over a larger time frame rather than performing them in a bursty manner tends to have a further beneficial secondary effect of promoting more effective dynamic power management, particularly in a multi-core microprocessor, by facilitating transitions to sleeping states by idle cores.

There may be times where it is undesirable to institute the IPC-reduction actions even when the microprocessor has been commanded to transition to the lowest performance state. Therefore, the microprocessor only institutes the IPC-reduction actions if one or more of certain additional conditions exist, including, but not limited to, the following.

(1) Prior to the most recent transition to the lowest performance state, was the microprocessor running at a higher performance state for no more than a predetermined time period? More complex variations on this condition may be implemented. For example, the predetermined time period may vary for each of the higher performance states. Furthermore, the previous N performance states may be examined and a score calculated based on a weighted average of the time spent in each of the N performance states, and the additional condition is satisfied only if the calculated score is less than a predetermined score. The microprocessor includes counters that provide information about the amount of time spent in the various performance states.

(2) Has the microprocessor been in the lowest performance state at least a predetermined percentage of time over the most recent predetermined time period?

(3) Does the microprocessor support multiple performance states? In one embodiment, a given microprocessor part may be programmed at manufacturing time (via fuses) to enable it to support multiple performance states, e.g., a part for use in a mobile system such as a notebook computer or cellular telephone; whereas, another part may be programmed to not support multiple performance states, e.g., a part for use in a desktop computer.

(4) Does the operating system support multiple performance states? Some operating systems or operating environments do not support multiple performance states and therefore cannot communicate to the microprocessor whether the workload is great or small; therefore, it may be undesirable to reduce the performance of the microprocessor. In one embodiment, the microprocessor may keep a flag that indicates whether at least one performance state transition has been requested by the operating system since it was booted or since the microprocessor was reset; or, the microprocessor may keep a counter that indicates the number of times a performance state transition has been requested by the operating system since it was booted or since the microprocessor was reset, and the microprocessor only institutes the IPC-reduction power saving measures if the counter value is greater than a predetermined value.

(5) Has the user disabled the IPC-reduction power saving measures feature, e.g., via a BIOS setup option?

The IPC-reduction power saving measures and additional conditions are not limited to those just mentioned, and other embodiments are contemplated in which other IPC-reduction power saving actions may be taken and other additional conditions may be necessary in order to institute the power saving measures.

Referring now to FIG. 2, a block diagram of a microprocessor according to the present invention is shown. The microprocessor 100 includes control register 126 writeable with values, or flags, to indicate whether particular IPC-reduction actions should be instituted to reduce power consumption when running at the lowest core clock frequency. In one embodiment, microcode 142 of the microprocessor 100 writes the control register 126 with values to cause the microprocessor 100 to transition from an IPC-reduced operating mode to a normal operating mode, and vice versa.

The microprocessor 100 also includes a plurality of execution units 116 configured to execute instructions. The execution units 116 may include, but are not limited to, integer units, floating point units, media units, SIMD units, load/store units, and branch units. The microprocessor 100 is capable of issuing instructions to the execution units 116 in a superscalar fashion, i.e., of issuing multiple instructions per clock cycle to the execution units 116; however, advantageously, the microprocessor 100 is also capable of operating in an IPC-reduction mode in order to reduce power consumption by issuing instructions to the execution units 116 in a scalar fashion, i.e., of issuing a single instruction per clock cycle to the execution units 116.

The microprocessor 100 also includes an instruction cache 102 that caches instructions from a system memory (not shown). As mentioned above, the instructions are variable-length, such as is the case with many complex instruction set computer (CISC) architectures like the x86 instruction set architecture, i.e., different instructions of the instruction set may have different lengths, e.g., between 1 and 13 bytes, in contrast to reduced instruction set computer (RISC) architectures that typically require fixed-length instructions, i.e., all the instructions of the instruction set are the same length, e.g., 32-bits.

The microprocessor 100 also includes an instruction formatter 104 that receives a stream of undifferentiated variable-length instruction bytes from the instruction cache 102 and formats them into distinct instructions. That is, the microprocessor determines the boundaries of the individual instructions within the stream of instruction bytes in order to indicate which contiguous bytes in the stream belong to which instruction. The instruction formatter 104 receives an input from a control register 126 that indicates whether the instruction formatter 104 is to format in a high performance mode in which it formats as many instructions as it can per clock cycle (i.e., multiple instructions per clock cycle) or in a low power mode in which it formats only a single instruction per clock cycle. The formatted instructions are placed into a formatted instruction buffer 106.

The microprocessor 100 also includes an instruction translator 108 that receives the formatted instructions from the formatted instruction buffer 106 and translates them into simpler microinstructions that are executable by the execution units 116. The instruction translator 108 receives an input from the control register 126 that indicates whether the instruction translator 108 is to translate in a high performance mode in which it translates as many instructions as it can per clock cycle (i.e., multiple instructions per clock cycle) or in a low power mode in which it translates only a single instruction per clock cycle. The translated microinstructions are provided to a register alias table (RAT) 112.

The RAT 112 receives the translated microinstructions in program order and generates dependency information for each microinstruction. The dependency information specifies which older instructions, if any, the instant instruction is dependent upon in order to be allowed to issue to an execution unit 116 for execution. For example, the instruction may require the result of an older instruction as a source operand. The RAT 112 also receives microinstructions from the microcode 142. The instruction translator 104 invokes microcode 142 when the instruction translator 104 encounters a complex instruction that it cannot translate into a predetermined number of microinstructions (e.g., three). For example, the microcode 142 may be invoked in response to an instruction that instructs the microprocessor 100 to transition to a new performance state or power state. Additionally, the microcode 142 may be invoked in response to other events, such as interrupts or other exception conditions.

The microprocessor 100 also includes an issue unit 118 that uses the dependency information generated by the RAT 112 to decide when to issue an instruction to the execution units 116 for execution. The issue unit 118 receives an input from the control register 126 that indicates whether the issue unit 118 should issue instructions to the execution units 116 in a high performance superscalar mode in which it issues as many instructions as it can per clock cycle (i.e., multiple instructions per clock cycle) or in a low power mode in which it issues only a single instruction per clock cycle.

The microprocessor 100 also includes a memory subsystem 138 to which the execution units 116 make requests to read or write data. In one embodiment, the memory subsystem 138 includes a level-1 cache 144 and a level-2 cache 146, although additional levels in the cache hierarchy may also be included. The memory subsystem 138 accesses the cache memories 144/146 in response to the memory access requests from the execution units 116. Additionally, the memory subsystem 138 may internally generate memory access requests to the cache memories 144/146, such as snoop requests, virtual memory table walks, cache line evictions, or cache line allocations. The memory subsystem 138 receives an input from the control register 126 that indicates whether the memory subsystem 138 is to access the cache memories 144/146 in a high performance mode in which it accesses the cache memories 144/146 in a parallel fashion to reduce memory access latency or in a low power mode in which it accesses the cache memories 144/146 in a serial fashion, i.e., accesses the L1 cache 144 first and then accesses the L2 cache 146 only after, and if, the access misses in the L1 cache 144.

The microprocessor 100 also includes an instruction retire unit 118 that retires instructions in program order, even though they may have been executed out of program order. That is, the instruction retire unit 118 updates the architectural state of the microprocessor 100 (e.g., instruction pointer, register set, memory) with results of executed instructions in program order. The instruction retire unit 118 receives an input from the control register 126 that indicates whether the instruction retire unit 118 is to access the cache memories 144/146 in a high performance mode in which it accesses the cache memories 144/146 in a parallel fashion to reduce memory access latency or in a low power mode in which it accesses the cache memories 144/146 in a serial fashion, i.e., accesses the L1 cache 144 first and then accesses the L2 cache 146 only after, and if, the access misses in the L1 cache 144.

The microprocessor 100 also includes model specific registers (MSR) 122. The MSR 122 may be written and read by system software, such as BIOS or the operating system, in order to control or determine the status of various features of the microprocessor 100, including the IPC-reduction power saving feature described herein. For example, BIOS may enable a user to write to an MSR 122 to disable the IPC-reduction power saving feature, in response to which a user disable flag 132 is updated to indicate such.

The microprocessor 100 also includes fuses 124 that may be blown during manufacture of the microprocessor 100 to enable or disable various features and set various configuration values, including enabling or disabling the IPC-reduction power saving feature and various related parameters, such as which of the IPC-reduction power saving actions will be instituted. Additionally, the fuses 124 may be blown during manufacture of the microprocessor 100 to indicate whether the microprocessor 100 supports the ability to operate in multiple running states or only a single running state.

The microprocessor 100 also includes performance state change counters 128 that count the number of times the microprocessor 100 has been requested by system software to change to a different performance state. Additionally, the microprocessor 100 includes counters 134 that count the amount of time (e.g., number of core clock cycles) in a most recent predetermined amount of time (e.g., the most recent 100,000 core clock cycles) the microprocessor 100 has been running in each possible performance state it supports.

Figure 3:
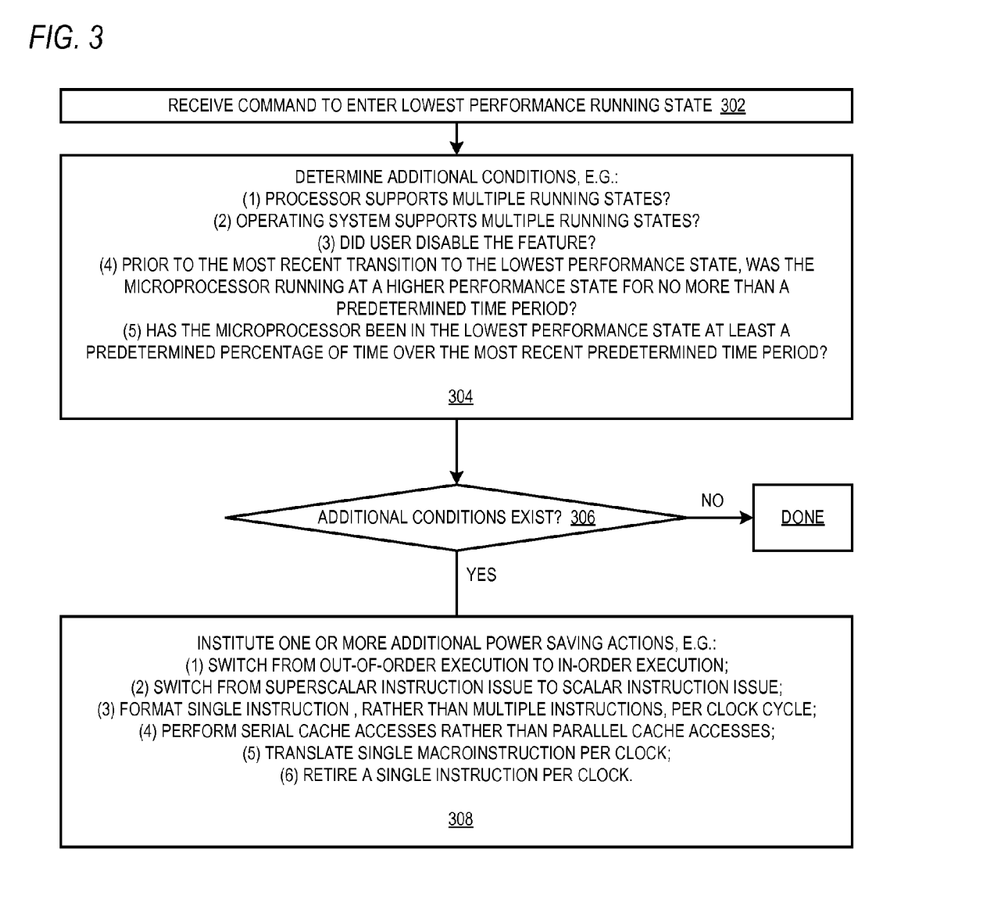
FIG. 3 is a flowchart illustrating operation of the microprocessor of FIG. 2.

Referring now to FIG. 3, a flowchart illustrating operation of the microprocessor 100 of FIG. 2 according to the present invention is shown. Flow begins at block 302.

At block 302, the microprocessor 100 is commanded to enter its lowest performance running state, which is an indication that the system software desires the microprocessor 100 to operate at its lowest power consumption level while still in a running state, i.e., without sleeping or performing the power saving actions associated with sleep states. In one embodiment, the lowest performance running state implies running the microprocessor 100 at its lowest supported core clock frequency. The command may come from system software, for example, as a write to an MSR 122, in response to which the microprocessor 100 may invoke the microcode 142. Additionally, the command may come from the microprocessor 100 itself. For example, the microcode 142 may detect a reason to run the microprocessor 100 at its lowest supported core clock frequency. Flow proceeds to block 304.

At block 304, the microprocessor 100 examines the existence of additional conditions to determine whether it is warranted to institute IPC-reduction power saving actions, such as one or more of the additional conditions discussed above. For example: (1) the microprocessor 100 may examine the performance state duration counters 134 (or other indicators within the microprocessor 100) to determine whether the microprocessor 100 was running at a higher performance state for no more than a predetermined time period prior to the request received at block 302 to transition to its lowest performance state, where the predetermined time period may vary for each of the higher performance states; (2) the microprocessor 100 may examine the performance state duration counters 134 (or other indicators within the microprocessor 100) and calculate a score based on a weighted average of the time spent in each of the performance states to determine whether the calculated score is less than a predetermined score; (3) the microprocessor 100 may examine the fuses 124 and/or MSR 122 to determine whether it supports multiple performance states; (4) the microprocessor 100 may examine the performance state change request counters 128 to determine whether the operating system supports multiple performance states; and (5) the microprocessor 100 may examine the user disable flag 132 to determine whether the user has disabled the IPC-reduction power saving feature. In one embodiment, the existence of a single additional condition warrants instituting IPC-reduction power saving actions; whereas, in other embodiments, a combination of two or more additional conditions warrants instituting IPC-reduction power saving actions. Various embodiments are contemplated in which multiple combinations of additional conditions may suffice to warrant instituting IPC-reduction power saving actions. The initial combinations of additional conditions may be configured via the fuses 124 and/or the microcode 142; furthermore, the initial combinations of additional conditions may be overridden via writes to the MSR 122. In one embodiment, the microcode 142 performs the step of block 304. Flow proceeds to decision block 306.

At decision block 306, the microprocessor 100 uses the information obtained at block 304 to determine whether sufficient additional conditions exist to warrant instituting the IPC-reduction power saving actions. If so, flow proceeds to block 308; otherwise, flow ends.

At block 308, the microprocessor 100 institutes one or more IPC-reduction power saving actions, such as those mentioned above. In one embodiment, the microcode 142 writes to the control register 126, which provides the control inputs to the various functional units, such as the instruction formatter 104, the instruction translator 108, the RAT 112, the instruction issue unit 114, the execution units 116, the memory subsystem 138, and the instruction retire unit 118. For example, the microprocessor 100 may: (1) resort to in-order execution of instructions by the execution units 122, rather than out-of-order execution; (2) resort to scalar instruction issue by the instruction issue unit 114, rather than superscalar issue; (3) format only a single instruction per clock cycle by the instruction formatter 104, rather than formatting multiple instructions per clock; (4) access the cache memories 144/146 in the cache hierarchy in a serial fashion, rather than in parallel; (5) translate only a single macroinstruction per clock cycle by the instruction translator 108, rather than multiple macroinstructions per clock cycle; (6) retire only a single instruction per clock cycle by the instruction retire unit 118, rather than multiple instructions per clock cycle. In one embodiment, at block 308, the microprocessor 100 institutes the IPC-reduction power saving actions in a step-wise fashion. That is, the microprocessor 100 institutes one or more IPC-reduction power saving actions for a while, then institutes additional IPC-reduction power saving actions for a further while, and so forth until either all the IPC-reduction power saving actions are being instituted or the system software instructs the microprocessor 100 to enter state other than the lowest performance running state, e.g., a sleeping state or a higher performance state than the lowest performance running state. Flow ends at block 308.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to transition through a plurality of performance running states, ranging between lowest and highest, each comparatively characterized by differences in clock frequencies and/or voltage levels, the microprocessor comprising:
    functional units; and
    control registers, writeable to cause the functional units to institute one or more power-saving actions that reduce the instructions-per-clock rate of the microprocessor to reduce power consumption when the microprocessor is operating in its lowest performance running state;
    wherein the lowest performance running state comprises a non-sleeping state in which the microprocessor runs at its lowest supported clock frequency;
    wherein the microprocessor is configured with microcode to write the control registers to institute the one or more instructions-per-clock rate reducing actions, wherein the microcode is invoked in response to an instruction instructing the microprocessor to transition to the lowest performing running state.

2. The microprocessor of claim 1, wherein the one or more actions comprise:
    the functional units switch from executing instructions out of program order to executing instructions in program order.

3. The microprocessor of claim 1, wherein the functional units comprise an instruction issue unit, wherein the one or more power saving actions comprise:
    the instruction issue unit switches from issuing for execution multiple instructions per clock cycle to issuing only one instruction per clock cycle.

4. The microprocessor of claim 1, wherein the functional units comprise an instruction retire unit, wherein the one or more power saving actions comprise:
    the retire unit switches from retiring multiple instructions per clock cycle to retiring a single instruction per clock cycle.

5. The microprocessor of claim 1, wherein the functional units comprise an instruction format unit, wherein the one or more power saving actions comprise:
    the instruction format unit switches from formatting multiple instructions per clock cycle to formatting a single instruction per clock cycle from a stream of instruction bytes fetched from an instruction cache, wherein the stream comprises variable-length instructions, wherein said formatting comprises determining boundaries of the variable-length instructions within the stream.

6. The microprocessor of claim 1, wherein the functional units comprise a memory subsystem, wherein the one or more power saving actions comprise:
    the memory subsystem switches from accessing a plurality of cache memories of the microprocessor in a parallel fashion to a serial fashion.

7. The microprocessor of claim 1, wherein the functional units comprise an instruction translator, wherein the one or more power saving actions comprise:
    the instruction translator switches from translating multiple macroinstructions into microinstructions per clock cycle to translating a single macroinstruction into microinstructions per clock cycle.

8. The microprocessor of claim 1, wherein the functional units comprise an instruction translator, wherein the one or more power saving actions comprise:
    the instruction translator disables instruction fusing during translation of macroinstructions into microinstructions.

9. A microprocessor configured to transition through a plurality of performance running states, ranging between lowest and highest, each comparatively characterized by differences in clock frequencies and/or voltage levels, the microprocessor comprising:
    functional units; and
    control registers, writeable to cause the functional units to institute one or more actions that reduce the instructions-per-clock rate of the microprocessor to reduce power consumption when the microprocessor is operating in its lowest performance running state, only if a predetermined condition exists, wherein the predetermined condition is a function of an amount of time the microprocessor ran in one or more performance states prior to a most recent transition to the lowest performance running state and/or a time the microprocessor ran in the lowest performance running state after the most recent transition to the lowest performance state;
    wherein the lowest performance running state comprises a non-sleeping state in which the microprocessor runs at its lowest supported clock frequency.

10. The microprocessor of claim 9, wherein the predetermined condition is that prior to the most recent transition to the lowest performance running state, the microprocessor was running at a higher performance running state for no more than a predetermined time period.

11. The microprocessor of claim 10, wherein the microprocessor has a predetermined time period for each of the plurality of higher performance running states.

12. The microprocessor of claim 9, wherein the predetermined condition is that a calculated score is less than a predetermined score, wherein the calculated score is calculated based on a weighted average of time spent in each of a plurality of higher performance running states.

13. The microprocessor of claim 9, wherein another predetermined condition is that the microprocessor has been in the lowest performance running state at least a predetermined percentage of time over a most recent predetermined time period.

14. The microprocessor of claim 9, wherein another predetermined condition is that the microprocessor supports multiple performance running states.

15. The microprocessor of claim 9, wherein another predetermined condition is that the microprocessor detects that an operating system running on the microprocessor supports multiple performance running states.

16. The microprocessor of claim 9, wherein another predetermined condition is that a user of the microprocessor has not disabled said instituting the one or more power saving actions that reduce the instructions-per-clock rate of the microprocessor, in response to said receiving a command to enter the lowest performance running state.

17. A method for saving power consumption by a microprocessor configured to transition through a plurality of performance running states, ranging between lowest and highest, each comparatively characterized by differences in clock frequencies and/or voltage levels, the method comprising:

receiving a command to enter a lowest performance running state of the microprocessor, wherein the lowest performance running state comprises a non-sleeping state in which the microprocessor is running at its lowest supported clock frequency;

invoking microcode to write control registers to cause functional units of the microprocessor to institute one or more power-saving actions to that reduce the instructions-per-clock rate of the microprocessor to reduce power consumption; and instituting the one or more power saving actions that reduce the instructions-per-clock rate of the microprocessor in response to said receiving the command to enter the lowest performance running state.

18. The method of claim 17, wherein the one or more power saving actions comprises:

switching from executing instructions out of program order to executing instructions in program order.

19. The method of claim 17, wherein the one or more power saving actions comprises:

switching from issuing for execution multiple instructions per clock cycle to issuing only one instruction per clock cycle.

20. The method of claim 17, wherein the one or more power saving actions comprises:

switching from retiring multiple instructions per clock cycle to retiring a single instruction per clock cycle.

21. The method of claim 17, wherein the one or more power saving actions comprises:

switching from formatting multiple instructions per clock cycle to formatting a single instruction per clock cycle from a stream of instruction bytes fetched from an instruction cache, wherein the stream comprises variable-length instructions, wherein said formatting comprises determining boundaries of the variable-length instructions within the stream.

22. The method of claim 17, wherein the one or more power saving actions comprises:

switching from accessing a plurality of cache memories of the microprocessor in a parallel fashion to a serial fashion.

23. The method of claim 17, wherein the one or more power saving actions comprises:

switching from translating multiple macroinstructions into microinstructions per clock cycle to translating a single macroinstruction into microinstructions per clock cycle.

24. The method of claim 17, wherein the one or more power saving actions comprises:

disabling instruction fusing during translation of macroinstructions into microinstructions.

25. The method of claim 17, further comprising:

determining whether at least one of a plurality of predetermined conditions exists, prior to said instituting the one or more power saving actions;

wherein said instituting the one or more power saving actions is performed only if at least one of a plurality of predetermined conditions exists.

26. The method of claim 25, wherein the plurality of predetermined conditions comprises:

prior to the most recent transition to the lowest performance running state, the microprocessor was running at a higher performance running state for no more than a predetermined time period.

27. The method of claim 25, wherein the plurality of predetermined conditions comprises:

the microprocessor has been in the lowest performance running state at least a predetermined percentage of time over a most recent predetermined time period.

28. A computer program product encoded in at least one non-transitory computer usable medium for use with a computing device, the computer program product comprising:

computer usable program code embodied in said medium, for specifying a microprocessor, the computer usable program code comprising:

first program code configuring the microprocessor to transition through a plurality of performance running states, ranging between lowest and highest, each comparatively characterized by differences in clock frequencies and/or voltage levels;

second program code for specifying functional units;

third program code for specifying control registers, writeable to cause the functional units to institute one or more power-saving actions that reduce the instructions-per-clock rate of the microprocessor to reduce power consumption when the microprocessor is operating in its lowest performance running state;

wherein the lowest performance running state comprises a non-sleeping state in which the microprocessor runs at its lowest supported clock frequency; and further comprising fourth program code to write the control registers to institute the one or more instructions-per-clock rate reducing actions, wherein the fourth program code is invoked in response to an instruction instructing the microprocessor to transition to the lowest performing running state.

* * * * *